United States Patent [19]

Snyder

[11] 4,252,239
[45] Feb. 24, 1981

[54] CARPENTER'S COMBINATION PORTABLE POWER-OPERATED HAND AND TABLE SAW

[76] Inventor: Raymond C. Snyder, 16844 Lahser, Apt. 130, Detroit, Mich. 48219

[21] Appl. No.: 40,637

[22] Filed: May 21, 1979

[51] Int. Cl.³ .............................................. B65D 85/54
[52] U.S. Cl. .................................. 206/349; 144/285; 220/94 R; 217/125; 312/DIG. 33
[58] Field of Search ............... 206/577, 349, 372, 373, 206/549; 220/94 R; 16/110.5; 312/DIG. 33; 150/12, 33; 217/57, 125; 229/52 R, 52 A; 144/285, 286 A, 286 R, 288 R

[56] References Cited

U.S. PATENT DOCUMENTS

| | | | |
|---|---|---|---|
| 410,686 | 9/1889 | Gandy | 217/125 |
| 1,097,025 | 5/1914 | Idaka | 217/125 |
| 2,104,262 | 1/1938 | Leigh | 217/125 |
| 2,697,460 | 12/1954 | Barnett | 206/349 |
| 2,702,626 | 2/1955 | Nuttle | 312/DIG. 33 |
| 3,862,686 | 1/1975 | Kolarik et al. | 206/349 |
| 3,933,243 | 1/1976 | Schurman | 206/349 |

Primary Examiner—Joseph Man-Fu Moy
Attorney, Agent, or Firm—Burton, Parker & Schramm

[57] ABSTRACT

Relates to a combination carpenter's portable power operated hand saw and table saw in which the hand carrying case forming the table of the combination approximates in size that of travel suitcases and similar forms of luggage. The case is provided interiorly with guides for receiving and removably suspending a power driven hand saw in inverted or upside down relationship to the normal usage of the portable saw such that the blade of the saw is projectionable through a slot in the top of the case for cutting purposes. Means is provided inside the case for withdrawing the blade from the slot through which it projects when not in use and for tilting the blade to selection positions for making inclined cuts. Means is provided externally of the case for guiding the work product being cut, the guiding member for this purpose being slidably movable varying distances from the plane of the blade. Means is also provided for knock down packaging of the parts of the case for shipping purposes.

4 Claims, 12 Drawing Figures

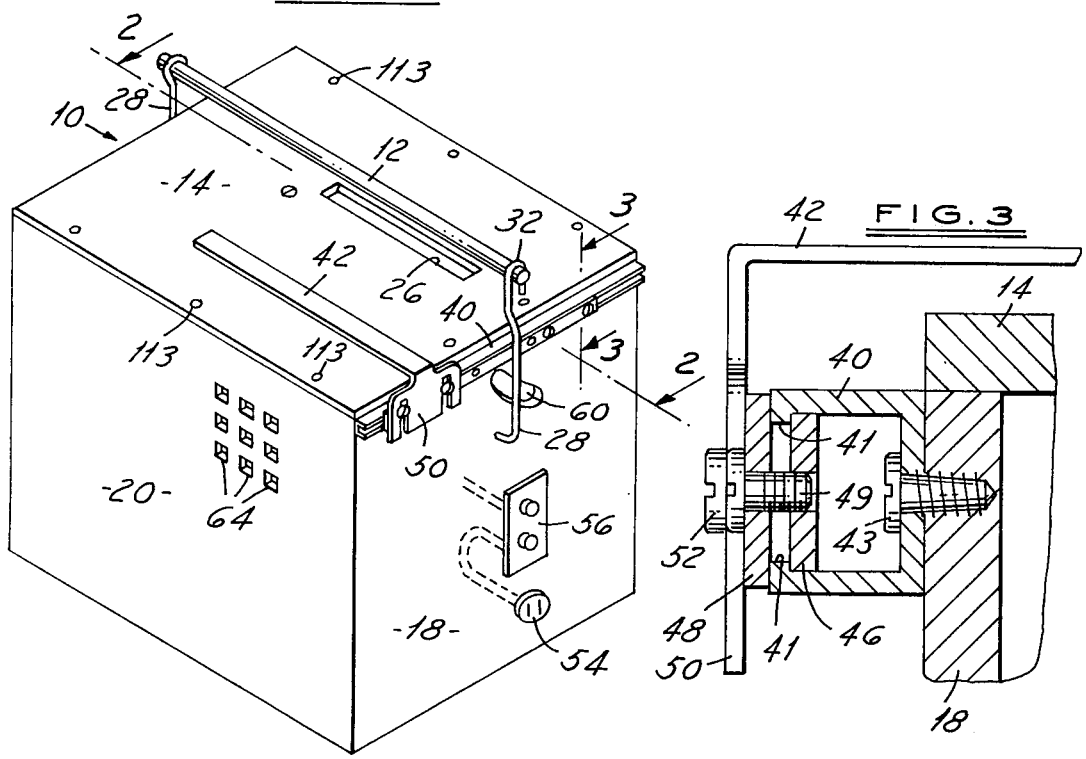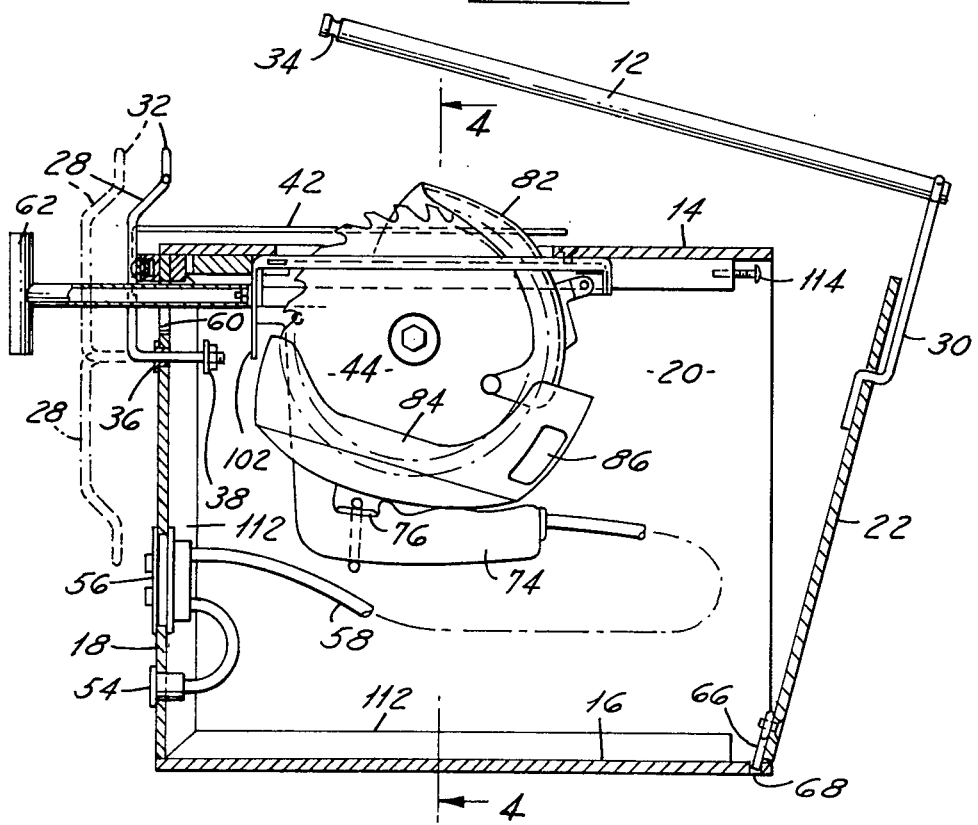

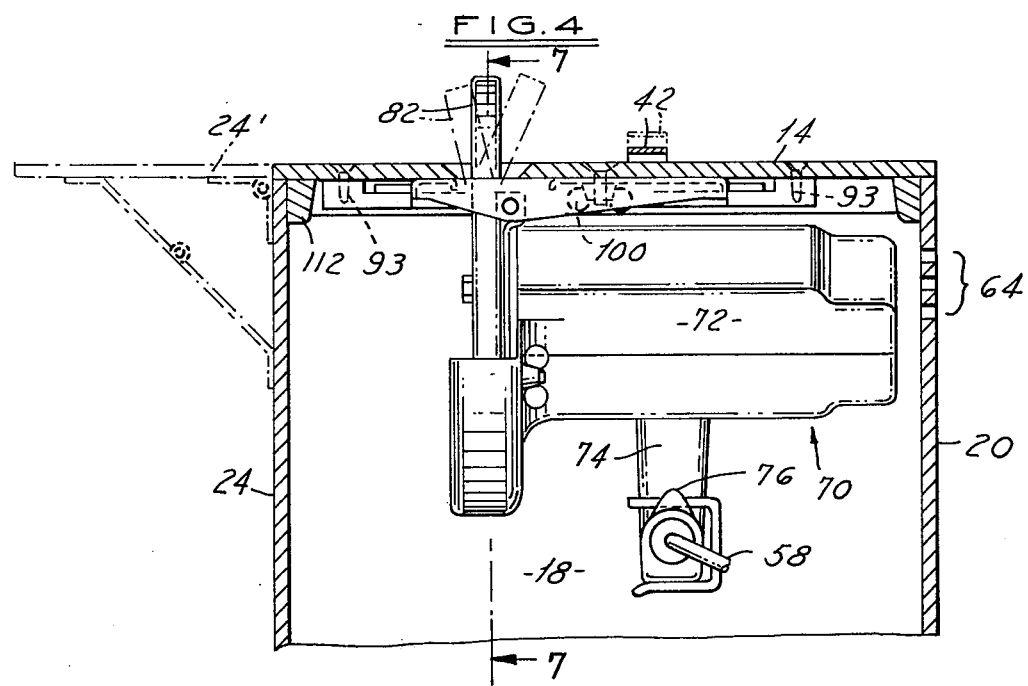
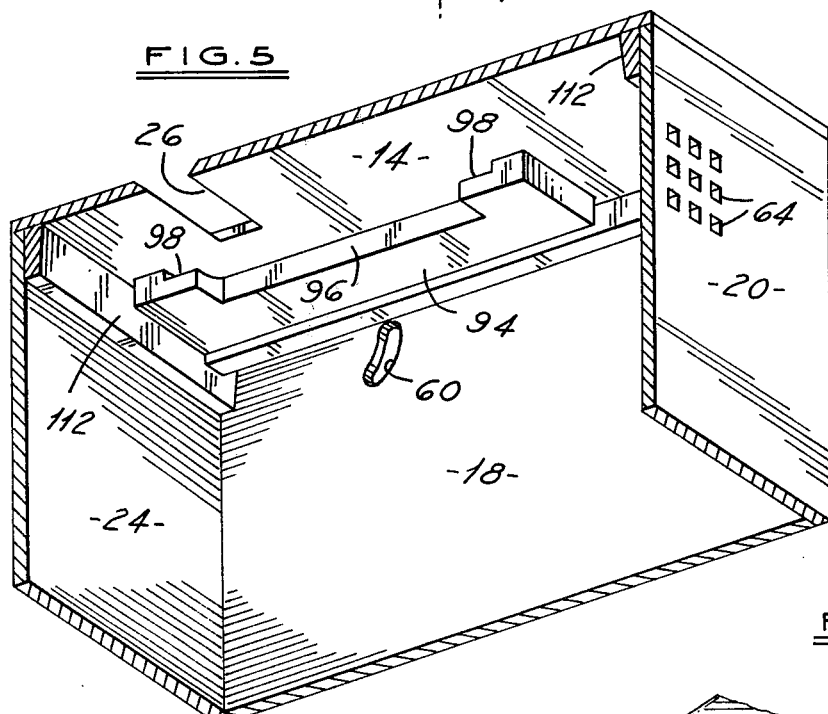
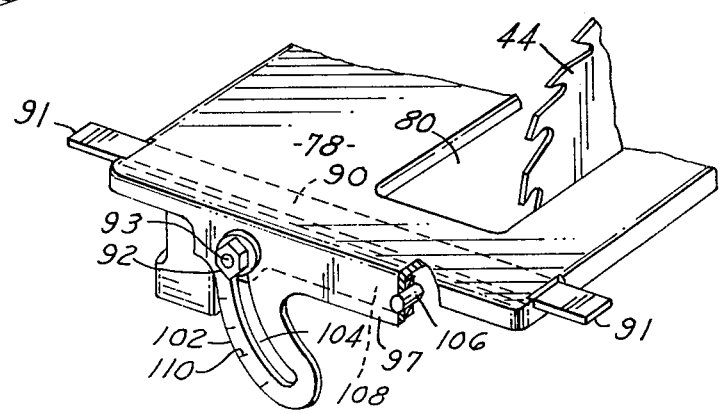

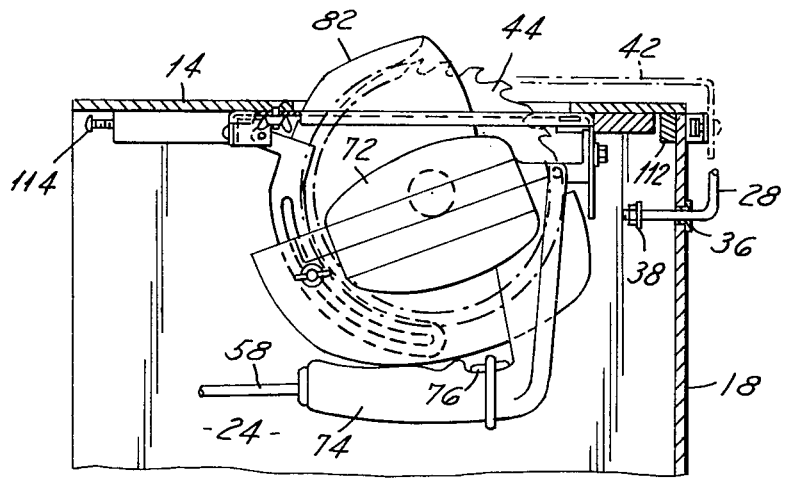
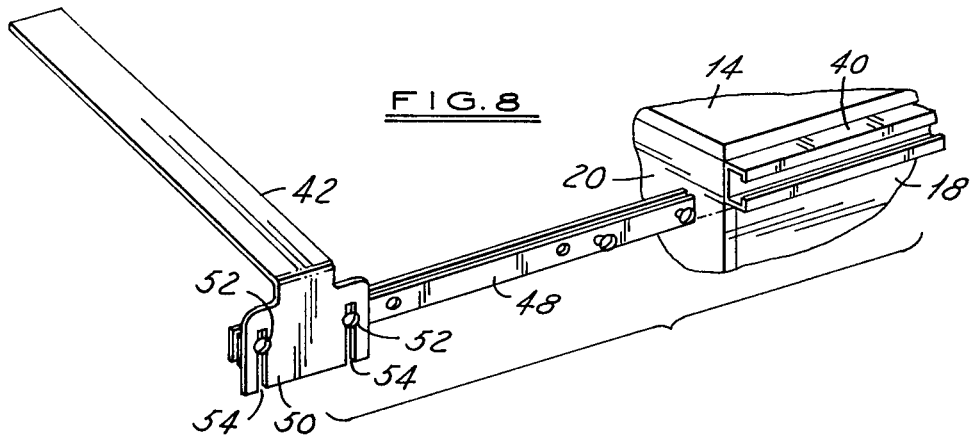
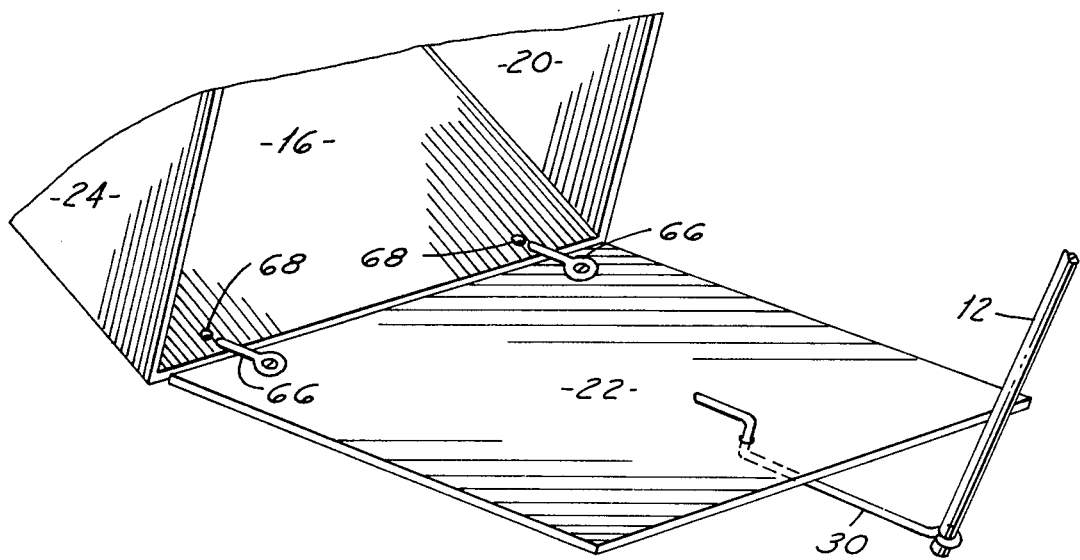

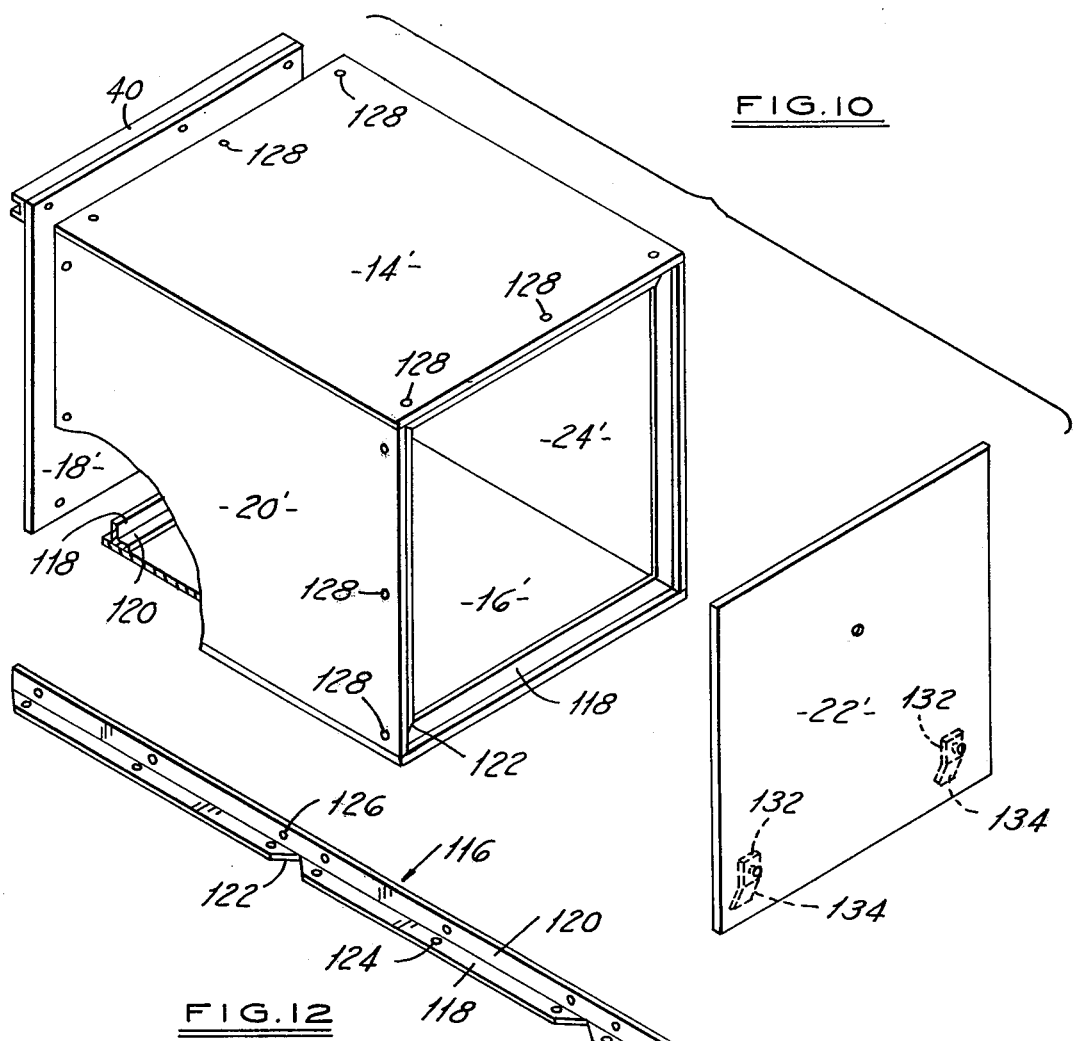

CARPENTER'S COMBINATION PORTABLE POWER-OPERATED HAND AND TABLE SAW

BACKGROUND OF THE INVENTION

This invention relates to a combination of a portable power driven hand saw and a case or housing unit therefor which enables the portable hand saw to function as a portable table saw.

In the past, relatively inexpensive portable powered hand saws have been used in the home and at construction or job sites for severing materal of various kinds, such as wood, metal, masonry materials, etc. Similarly, relatively more expensive stationary table saws and stands associated therewith have been transported by the professional carpenter to the job site and used by him at a central location at the site. This obviously requires the acquisition of more expensive equipment over that needed for the portable hand saw. What has not occurred, so far as applicant is aware, is the joinder or melding of these two parallel types of sawing equipment in which a part of one is combined with a part of the other to form an operative assembly of elements incorporating certain advantages of both in a simpler, less expensive organization of parts. It is apparent from the foregoing recitation that there has been a need for an improved tool which combines certain functional and technical advantages of the portable power operated hand saw and the normally non-portable table saw and its associated stand or framework.

SUMMARY OF THE INVENTION

It is therefore an important object of the invention to provide a novel and efficient combination of a portable power operated hand saw and a support structure having the attributes of a table saw.

Another important object of the invention is to provide a mounting arrangement for a power operated saw which combines certain functions and features of the portable-type power operated hand saw with the stand of a table saw in a novel and improved combination of operating element.

A further important object of the invention is to provide a mounting arrangement for removably securing a portable power operated hand saw in the interior of a unit generally dimensioned in the form of a suitcase for portability including a handle for carrying the same, but the unit being also capable of serving as a stand or table for performing sawing operations.

A still further important object of the invention is to expand the capabilities of the portable hand held power saw to the realm of table saws where the portable power saw is mounted interiorly of a hand carrying case which also functions as a table for performing sawing operations.

A still further important object of the invention is to provide an improved collapsible or knock-down version of a case or housing for a combination portable power operated hand saw and support structure therefor which is especially designed for demountable shipping conditions.

In carrying out these and other objects of the invention, the invention contemplates the utilization of a unitary assembly comprising, in the main, a housing of a size comparable to a suitcase and carrying a handle for convenient portability and a conventional portable type powered hand saw secured in the interior of the housing but being accessible from the outside for performing many of the usual functions of a table saw. In this form of installation, the powered hand saw has many of the attributes of a conventional stationary table saw, yet it can be removed from the housing, if desired, in order to perform its normal functions as a portable powered hand saw. When mounted within the housing, the hand saw is capable of being adjusted to project its blade through a slot in the housing and also capable of being tilted in the housing to cause its blade to make accurate angle cuts. The housing, in addition, serves as protection for the portable hand saw mounted therein as well as for an assortment of extra blades and other operating elements stored therein.

BRIEF DESCRIPTION OF THE DRAWING FIGURES

Various other objects, advantages and meritorious features of the invention will become more fully apparent from the following specification, appended claims and accompanying drawing sheets wherein:

FIG. 1 is a perspective view of an embodiment of the invention showing the external formation of the case or housing within which certain operating elements are enclosed and the use of a handle for convenient portability;

FIG. 2 is a vertical cross sectional veiw taken along line 2—2 of FIG. 1 and showing a power-driven saw mounted in inverted position within the housing and carrying a rotary saw blade projecting through the top of the housing and further showing the handle and one side wall thereof in released condition;

FIG. 3 is an enlarged vertical sectional view taken along line 3—3 of FIG. 1 and showing the interior construction of means for guiding the work product being cut;

FIG. 4 is a vertical cross sectional view taken along line 4—4 of FIG. 2 and showing the mounting arrangement from this point of view for removably suspending the power driven hand saw in inverted relationship to its normal usage as a portable saw;

FIG. 5 is a perspective view of the interior of the casing or housing with the power driven hand saw removed therefrom;

FIG. 6 is an enlarged perspective view of the mechanism for inclining the plane of the saw blade in its operative position within the housing;

FIG. 7 is a vertical cross sectional view taken along line 7—7 of FIG. 4 and showing the side of the saw blade opposite to that shown in FIG. 2;

FIG. 8 is an enlarged fragmentary perspective view of a track for adjustably positioning a work piece guide relative to the saw blade;

FIG. 9 is an enlarged fragmentary perspective view of the rear wall area of the casing showing the rear wall in fully opened condition and slightly detached from the remaining walls of the casing;

FIGS. 10, 11 and 12 illustrate a preferred form of knock-down type of case which is not only capable of withstanding rugged usage in erect operable condition but also is speedily demountable to form a flat package for shipping purposes, of which FIG. 10 is an exploded perspective view showing the parts of the case in the order of assembly. FIG. 11 is a perspective view of one of the two interior end supports of the casing prior to being bent into a rectangular frame, and FIG. 12 is a side elevation of the casing, partly broken away in section, and showing the parts of the case in erected operable condition.

DESCRIPTION OF PREFERRED EMBODIMENTS

FIG. 1 illustrates the exterior parts and surfaces of a combination carrying case and table 10 which is cubical in shape and akin to a suitcase in size and configuration even to the extent of having a hand carrying handle 12. Although the first illustrated embodiment of the invention is not shown to be collapsible, a second embodiment illustrated in FIGS. 10, 11 and 12 is made to be dismountable and collapsible for shipping purposes. In other words, the components of the second embodiment may be sold and shipped in "knocked-down" condition and erected into its box-like shape by the purchaser who may then permanently retain it in erected usable condition.

The walls of the six-sided carrying case 10 are separately identified as the top member 14, bottom member 16, and side wall members 18, 20, 22 and 24. Externally of the carrying case 10, the top member 14 and the side wall member 18 support most of the outside equipment associated with this combination tool and such will be first described. It may be also helpful to consider the side wall member 18 as serving as the front end or face of the case 10 and that its opposite wall 22 serves as the rear or back wall thereof.

For portability, the handle 12 for the carrying case 10 usually extends in spaced parallel relationship with the top member 14 and the slot 26 thereof and is loosely connected by rod 28 to the wall member 18 as shown in FIG. 2 and by rod 30 to the opposite wall member 22 as also shown in FIGS. 2 and 9. One end 32 of rod 28 is partially wrapped or looped around a narrowed neck portion 34 at that end of the handle that overlies the front face 18 of the case. Such end 32 of rod 28 elastically grips the neck 34 with sufficient force normally to hold the same against separation, but when the handle 12 is pressed downwardly and rearwardly toward the back wall member 22, it will widen the opening in the looped end 32 and free the handle therefrom with the result that the handle 12, rod 30 and back wall member 22 will fall away from the carrying case 10 in the manner illustrated in FIGS. 2 and 9. Since the connection between the handle 12 and the rod 30 is intended to be permanent, it will transfer the forces incurred by the rearward motion of the handle to the tilting motion of the back wall member 22 out of its frame in the carrying case 10 as shown in FIG. 9. This is an important safety precaution because it assures the presence of a large vent opening into the interior of the casing which now begins to assume the shape of a table for the power saw. Once the rod 28 is freed from the handle 12 it can be pulled back to the dot-dashed position shown in FIG. 2 and allowed to rotate to its hang-down position also shown in FIG. 2 where it is out of the way of other controlling devices. The provision of a ring or bushing 36 in the front wall 18 of the casing enables the rod 28 to have a slight play fore and aft of the casing 10 before being stopped by collar 38 fixed on the inner end of the rod 28.

A track 40 is carried on the outer face of the side wall member 18 of the carrying case 10 for adjustably positioning a work piece guide 42 relative to a rotary saw blade 44 which in operation projects part way through the slot 26 in the top member 14. The guide is shaped with two parallel sides and is mounted on the track 40 with these sides in parallel relation to the slot 26 and the saw blade 44 projecting therethrough and for bodily motion toward and away from the blade and slot while maintaining this parallel relationship. The guide 42 together with its two parallel sides extends over the upper surface of the top member 14 in spaced relation thereto, which spaced relationship is preferably adjustable as described hereinafter.

A desirable mounting arrangement for the guide member 42 is illustrated in FIGS. 3 and 8. As best shown in these two Figures, the track member 40 is C-shaped in cross section, having the mouth of its opening into the track of less dimension than that of the interior of the track member to form two opposing lips 41—41 as shown in FIG. 3. The base of the C-shaped track member is secured to the side wall member 18 by any suitable means such as by screws, one of which is shown at 43 in FIG. 3. Clampingly engaging the two lips 41—41 are a pair of strip-like metallic members 46 and 48 of different widths. The strip 46 of narrower width is located inside of the track in abutting engagement with the inside surfaces of the two lips 41—41, and similarly the strip 48 of wider width is located outside of the track in abutting engagement with the outside surfaces of the two lips 41—41. Clamping pressure drawing the two strips toward one another and into gripping engagement with the two lips 41—41 is supplied by screws 49 which are so threaded as to draw the two strips toward one another and clamp the same to the inturned lips 41—41 to hold the strips against forces tending to move the strips in either direction along the track 40.

It is evident from FIGS. 3 and 8 that the guide member 42 has a perpendicularly extending end portion 50 which is adjustable and removably attached to the outermost strip member 48 by two similar screws 52—52. As shown in FIG. 8, the shanks of the screws 52—52 pass through parallel slots 54—54 which are opened at their bottom ends thereby enabling the guide member 42 to be mounted upon the screws 52—52 and be vertically adjusted with respect to the upper surface of the top member 14 of the table. When tightened the screws 52—52 will hold the guide member 42 at the desired height above the upper working surface of the top member 14. It is apparent from FIG. 8 that the guide member 42 is assembled on the track member 40 by endwise slidable movement of the clamping elements 46 and 48 on the opposite sides of the two lips 41—41 of track member 40. It is also apparent from FIG. 1 that the guide member 42 is movable along the track 40 to the side of the slot 26 opposite to its position shown in FIG. 1.

The front end 18 of the casing 10 also carries an electric outlet 54 for connection by lead-in wires (not shown) to a suitable source of electrical power for operating the power driven hand saw. Mounted nearby on the same end wall 18 is an electrical switch 56 having two depressible buttons, one for turning on the power to the saw motor when the outlet 54 is connected to an external source of electrical power, and the other button for turning off the electrical power delivered to the casing 10. The wiring connection 58 from outlet to the motor of the rotary blade saw in the interior of the casing 10 is shown in FIG. 2. The front end wall member 18 also has a kidney-shaped aperture 60 therethrough through which a removable T-shaped handle wrench 62 may be extended to reach, and loosen or tighten as the situation may call for, a certain control element associated with the power driven hand saw for tilting the saw blade in the slot 26 as will be described in more detail hereinafter. In wall member 20 (FIGS. 4 and 5) a matrix of small openings 64 are formed for admitting air to the motor of the hand saw to keep it relatively cool. The back panel or wall 22, which is flipped off of the casing 10 when the handle 12 is disconnected from rod 28, contains two spaced apart similarly shaped prongs 66—66 which normally enter correspondingly located holes 68—68 in the bottom member 16 when the casing 10 is not in use. The entrance of the prongs in the holes 68—68 helps keep the lower end of the back wall from separation from the casing until an inclined position is reached, as shown in FIG. 9, where the prongs 66—66 are tilted out of the holes 68—68 in which they normally extend when the casing is not opened for operation.

The specification so far has dealt in the main with the external operating features associated with the casing 10 including the rotary saw blade 44 removably attachable to the portable, powered hand saw. Such electrically powered rotary blade hand saws are presently available commercially from many sources. Almost all of these portable circular saw machines have the ability to raise and lower the blade and to permit angular tilting of the blade to one side or the other for bench or angular cutting. The one illustrated herein is a 7" blade type manufactured in the United States for the S. S. Kresge Company, Troy, Mich., and is generally indicated by reference character 70. Component parts of such a machine include an electric motor enclosed within a metal housing 72, a handle 74 having a trigger switch 76 to which lead-in conductor 58 is connected, a base plate 78 (See FIG. 6) having a rectangular slot 80 through which the circular saw blade 44 is projectionable. Other components of the portable hand saw include an arcuate saw blade guard 82 and an arcuate saw dust collector 84 (see FIG. 2) having an aperture 86 forming a saw dust exit from the collector adjacent to the opened vent provided by the removal of the back wall 22.

The assembled portable rotary blade saw, such as described above, is mounted in the carrying case 10 in inverted or upside down relation to its normal usable position when operated without the benefit of the casing. In other words, as shown in FIGS. 2, 4 and 7, the handle 74 of the portable electrically operated power saw is positioned on the underside of the motor housing 72, whereas the base plate 78 is positioned against the underside of the top member 14 of the casing 10 with its slot 80 in registration with the narrower slot 26 of the top member. Use is made of the base plate 78 and an attached elongated member referred to as a rip guide 90 (FIG. 6) for suspending the portable rotary hand saw 70 in this upside down fashion. The suspension provision brings the two slots 26 and 80 into registration and such that the rotary saw blade 44 may be projected varying distances through the two registering slots and angularly tilted with respect thereto as shown by the dashed outline of the blade guard 82 in FIG. 4. The suspension provision also aligns the kidney-shaped aperture 60 with a polygonally-shaped nut 83 previously mentioned which is reached by means of the T-handle wrench 62 (FIG. 2) as more fully described hereinafter.

Referring more particularly to FIGS. 5 and 6, the two Figures cooperate to explain the suspension provision for removably mounting the portable powered hand saw not only in the interior of the carrying case 10 but in operating condition for action as a table saw. FIG. 5 shows the interior of the case and particularly the underside of the top member 14 as viewed from the rear of the case and without the presence of any operating equipment mounted therein. Secured to the underside of the top member 14 by screws 93 (FIG. 4) or other suitable means is an elongated undermount or hanger 94 which lies across the space between the slot 26 and the kidney-shaped aperture 60 and is itself recessly shaped, as at 96, to receive the turned-down near edge 97 of the base plate 78 of the portable hand saw 70 as viewed in FIG. 6 and to snugly admit the opposite protruding end sections 91—91 of the rip guide 90 so that the weight of the portable hand saw is borne in the main by the recessed hanger. More specifically, the undermount or hanger 94 is provided with the wide recess 96 centrally located thereon for receiving the turned-down near edge 97 of the base plate 78 while a pair of narrower recesses 98—98 at the opposite ends of the hanger are provided for snugly receiving the opposite end sections 91—91 of the rip guide member 90 and suspending the portable powered hand saw 70 therefrom. Additional means, such as in the form of a bolt and wing nut assembly 100 (FIG. 4), may be provided near the rear end of the slot 26 for clamping this area of the base plate 78 of the portable hand saw 70 to the underside of the top member 14 of the case 10 for detachably holding the hand saw against shiftable movement relative to the recesses 96 and 98—98 of the hanger 94.

When the base plate 78 of the portable hand saw 70 is properly suspended from the hanger 94, a downwardly extending arcuate tongue 102, forming an extension of edge 97 of the base plate, contains an arcuate slot 104 which will register with the kidney-shaped aperture 60 in the front wall 18 of the casing. The arcuate slot 104 has a radius of curvature coinciding with the axis of a hinge pin 106 to which the saw blade 44 is coupled for varying the angle of the cuts made by the blade. As shown in FIG. 2 the T-shaped handle wrench 62 bridges the space between the kidney-shaped aperture 60 and the polygonally-shaped nut 92 which is threaded to a bolt 93. The bolt 93 enters the arcuate slot 104 and is attached to the outer end of an arm 108 which is located immediately behind the down-turned edge 97 of the base plate and is fixed to the hinge pin 106 for joint rotation therewith. An arcuate scale 110 is marked on the tongue 102 along one side of the curved slot 104 to measure changes in the inclination of the plane of the saw blade 44. To make such changes in the settings of the saw blade, the T-shaped handle wrench is extended through the kidney-shaped aperture 60 to enclose and grip the polygonally-shaped nut 92. Thereafter, the nut is first turned to lessen the clamping pressure of the nut and washer following which the T-handle wrench is bodily moved in the arcuate slots 60 and 104 to swing the arm 108 to rotate the pivot pin 106 and adjust the inclination of the saw blade 44.

It is evident from a comparison of FIGS. 1, 2 and 7 that in the hand carrying position of the handle 12 it overlies the top panel or member 14 in spaced unconnected relation thereto, but has its opposite extremities attached by rod-shaped means to the two end walls 18 and 22 of the casing. It is also apparent that the rod connection 28 not only releases the handle in the manner shown in FIG. 2, but also removes the still connected end wall 22 from the casing as also shown in FIG. 2 and in FIG. 12. This dual function not only removes the handle 12 out of the way of the external operating elements of the powered saw machine but also automatically provides a large vented opening into the interior of the casing which might otherwise be overlooked in starting up the operation of the assembly.

Certain conventional reinforcing means is provided interiorly of the casing to join one another of the wall members along their abutting edges and thereby rigidify the cubical structure of the casing. Such means comprises individual corner fitting supporting strips 112 such as illustrated in FIGS. 2 to 5 and 7. These strips may be adhesively secured to the surfaces of the wall members which they abut or may be nailed in place as represented by nail heads shown at 113 in FIG. 1. To enable the rear or back wall panel 22 to provide its automatic removal from the casing at the time the handle 12 is dismounted, the corner strips 112 are stopped short of the back panel 22 as shown in FIGS. 2 and 7, sufficient for the rear end wall 22 to be recessly received within the rear end portions of the wall members 14, 16, 20 and 24. As previously mentioned, the entrance of the two prongs 66—66 into the holes 68—68 of the bottom side wall member acts as a hinge holding the rear wall member 22 from complete separation from the casing until a sufficient angle to the vertical is attained at which time the rear wall member is flipped away from the casing and exposing a large opening thereinto. A pair of stopper elements 114 (one of which is shown in FIGS. 2 and 7) are threaded into the corner strips 112 underlying the top wall member 14 to position the rear wall member 22 in abutting vertical position therewith when the saw mechanism is not intended to be operated and the rod 28 is connected to the front end of the handle 34. Being threaded to the corner strips 112 associated with the vent opening at the rear of the device, the stoppers 114 are lengthwise adjustable to vary the abutting position of the rear panel member 22 of the casing and the tension placed on the handle 12 to hold the parts together.

FIGS. 10, 11 and 12 illustrate a modification of the invention having to do not only with the strengthening of the cubical structure forming the casing but also to provide a knock-down version forming a flat package for shipping purposes. Because many of the parts of the casing in the second modification are like those appearing in the first modification, they will be assigned the same reference numeral but primed to signify their different environment. The several wall members making up the casing 10' are identified at 14', 16', 18', 20', 22' and 24' and are shown in exploded perspective view in FIG. 10 in their order of assembly. Individually, before assembly into a box-like form, the wall members 14' to 24' are separate elements capable of being stacked in surface contacting parallel planes for shipping purposes as a group.

For rigidifying the wall members 14' to 24' inclusive into a cubical assembly, a pair of similarly shaped, straight length of bars or strips, one of which is generally indicated at 116 in FIG. 11, are bent into rectangularly shaped frames dimensioned to interfit with the side and end walls to form the desired sized cubical casing to house the power saw mechanism therewithin as previously described. Before being bent into rectangular shape, each strip 116 assumes a straight integrally connected series of similar parts of L-shaped cross section as shown in FIG. 11. In this respect, each strip 116 may also be considered as being divided into two longitudinally extending narrow bars or flanges 118 and 120 which extend at right angles to one another and are integrally connected with one another where their respective planes intersect. Bar 120 runs the full length of the strip without interruption. Bar 118, however, is notched at spaced intervals with right angled V-shaped openings 122 which extend toward the bar 120 and have their apexes terminating thereat. Also at spaced intervals the two bar parts 118 and 120 are provided with circular holes 124 and 126 respectively. These holes may be threaded or tapped to receive screws or be drilled or smoothbored to receive bolts or similar fastening devices.

When each strip 116 is bent 90° at each V-shaped opening 122 to lie within the plane of the bar 118, the opposite edges of each V-shaped opening will abut one another and stop further bending action. Such a bending operation results in the formation of each strip 116 into a closed rectangular frame, such as shown by the folded strip 116 and its four now angularly related parts 118 in FIG. 10. In other words, the strip 116 of FIG. 11 is subjected to a folding action of 90° at each notch 122, or a total of 360° in this embodiment, so as to bring the front end of the strip into abutting engagement with its rear end. The opposite terminal ends of each strip 116 provide a complementary half of a notch 122 for endwise abutment with one another. The two folded strips 116—116 serve as frames for mounting the front and rear end portions of the casing thereon. To this end, the holes 124 and 126 are provided in the two longitudinal parts 118 and 120 of each strip 116 for registration with holes 128 formed in the marginal portions of the side and end wall members of the casing and for use of such holes for fastening purposes. Fasteners are shown at 130 in FIG. 12 for this purpose.

For shipping purposes, each right angled strip 116 shown in FIG. 11 is not further assembled with the side and end wall members 14' to 24' other than to be folded upon itself with the aid of the notches 122 as previously described and stacked as a parallel layer among the wall members of the casing assembled and packaged for shipping purpose. Small accessory elements for erecting the cubical housing and securing the wall members to the rectangular frames could be lodged in the clearances in the shipping stack provided by such frames.

Instead of using prongs 66—66 (FIG. 9) which project from the rear end wall member 22 and are received in holes 68—68 in the bottom wall member 16 of the first embodiment of the invention, the second embodiment employs a pair of tabs 132 each having their upper end secured to the rear end wall 22' and their lower end section 134 laterally bent away interiorly of the casing so as to straddle the longitudinal bar 118 and releasably lock the lower portion of the end wall member 22' against separation from the casing unless forces to do so are directed rearwardly against the handle 12 as earlier mentioned herein.

While two particular embodiments of the invention have been described and illustrated, it will be understood, of course, that it is not desired that the invention be limited thereto since additional modifications may be made. It is, therefore, contamplated by the appended claims to cover any such modifications as fall within the true spirit and scope of the invention.

What is claimed is:

1. In a combination carrying case and a table for a portable power tool having a rotatable element, a rectangularly shaped case comprising four side wall members, a top wall member and a bottom wall member, one of said side wall members serving as a front wall to the case, and the wall member opposite to said front wall member having at least a part thereof removably connected to the case, an elongated handle normally overlying the top wall member and extending fore and aft of the case, and means detachably connecting one end of the handle to the front wall member such that upon release of such connection means both the handle and said part of the rear wall member will fall away from the case thus causing the removed part to open a vent to the interior of the case and further causing the displacement of the handle away from the outer surface of the top wall member thereby to provide a work surface for the rotatable element.

2. The combination carrying case defined in claim 1 wherein the part of the rear wall member which falls away from the case when the handle is released is the entire rear end member itself.

3. The combination carrying case as defined in claim 1 wherein a horizontal track is provided on the front wall member of the case and wherein a work piece guide member overlies the work surface of the top wall member, said work piece guide member having a part thereof adjustably positionable along the track in opposite directions therealong and toward and away from the rotatable element.

4. The combination carrying case as defined in claim 1 wherein a work piece guide member overlies the work surface of the top wall member, wherein a horizontal track is provided on the front wall member of the case, and wherein the work piece guide member has a part thereof overhanging the track and adjustably positionable along the track toward and away from the axis of rotation of the rotatable element.

* * * * *